(12) United States Patent
Jeong (10) Patent No.: US 8,237,766 B2
(45) Date of Patent: Aug. 7, 2012

(54) VIDEO TELEPHONY TERMINAL AND IMAGE TRANSMISSION METHOD THEREOF

(75) Inventor: June-Gyu Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1001 days.

(21) Appl. No.: 12/283,239

(22) Filed: Sep. 10, 2008

(65) Prior Publication Data

US 2009/0096859 A1    Apr. 16, 2009

(30) Foreign Application Priority Data

Oct. 10, 2007  (KR) .......................... 10-2007-0101940

(51) Int. Cl.
*H04N 7/14*    (2006.01)

(52) U.S. Cl. ................. 348/14.01; 348/14.02; 348/14.03

(58) Field of Classification Search .... 348/14.01–14.16; 382/118
See application file for complete search history.

(56) References Cited

U.S. PATENT DOCUMENTS

| | | | |
|---|---|---|---|
| 2004/0095358 A1* | 5/2004 | Takagi et al. | 345/589 |
| 2007/0294263 A1* | 12/2007 | Punj et al. | 707/10 |
| 2008/0259154 A1* | 10/2008 | Garrison et al. | 348/14.01 |

* cited by examiner

*Primary Examiner* — Melur Ramakrishnaiah (57) ABSTRACT

A video telephony terminal and an image transmission method thereof are provided. During video communication, the video telephony terminal generates a still image having a desired pattern in a user-desired region and provides a terminal of another party with an image achieved by synthesizing the generated still image with an image captured by a built-in camera. Upon establishing video communication, a change to the desired pattern in the user-desired region of the camera-captured image can be made quickly, or a desired message can be inserted into the captured image and can be transmitted in real time.

21 Claims, 5 Drawing Sheets

VIDEO TELEPHONY TERMINAL AND IMAGE TRANSMISSION METHOD THEREOF

CROSS-REFERENCE TO RELATED APPLICATION(S) AND CLAIM OF PRIORITY

The present application claims the benefit under 35 U.S.C. §119(a) from an application entitled "VIDEO TELEPHONY TERMINAL AND IMAGE TRANSMISSION METHOD THEREOF" filed on Oct. 10, 2007 and assigned Ser. No. 2007-0101940, the entire contents of which are hereby incorporated herein by reference.

TECHNICAL FIELD OF THE INVENTION

The present invention relates to a video telephony terminal and an image transmission method thereof, and more particularly, to a video telephony terminal and an image transmission method thereof that can transmit a synthesized image to a terminal of another party by synthesizing a still image generated by user data input from an input unit capable of sensing an input position such as a touch screen or the like with a camera-captured image.

BACKGROUND OF THE INVENTION

Video telephony is a technology that makes it possible to have a conversation by listening to the speech of another party while viewing the image thereof by simultaneously transmitting and receiving voice and image data.

Since the size of voice data is relatively small, call services via a wired network and a mobile telephone service based on global system for mobile communications (GSM) or code division multiple access (CDMA) technologies have already been commercialized. On the other hand, since image data has a significantly large size, a network for supporting a high transmission rate is required. For this reason, mobile terminals for video communication have not been commercialized.

However, a mobile video communication service using technologies of high-speed downlink packet access (HSDPA) and the like has been recently commercialized.

Video telephony has an advantage in that conversation may be made while viewing an image of another party, but has a drawback in that the image of the other party is transmitted even when the other party does not want to be viewed. Accordingly, the need exists for a technology capable of replacing or modifying a self-image with a proper image during a time in which the mobile video communication service is available.

To overcome the drawback, conventional video telephony terminals use a method for replacing a camera-captured image with a replacement still or moving image or superimposing a frame image on the camera-captured image.

Figure 1:
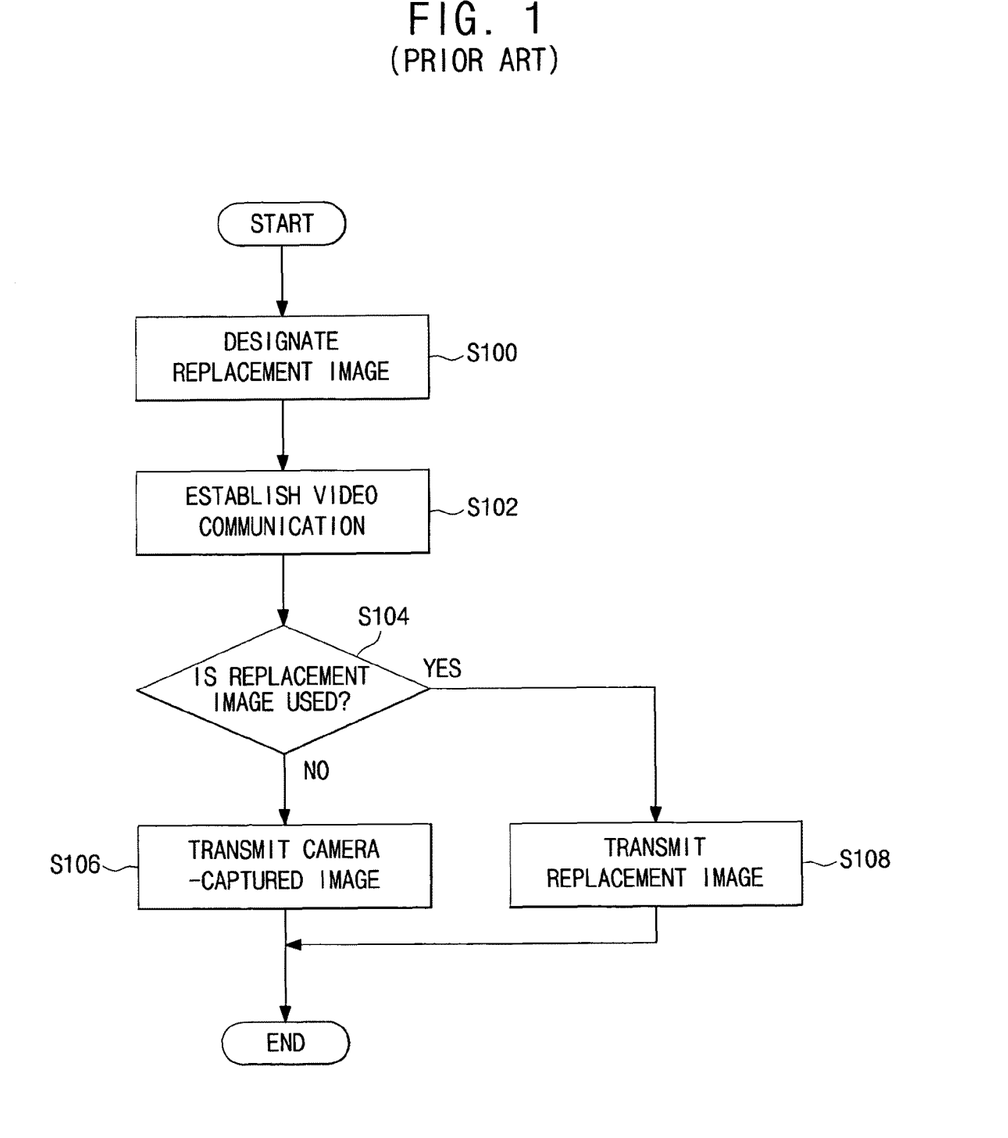
FIG. 1 is a flowchart illustrating a method for employing a replacement image in a conventional video telephony terminal.

A method for employing a replacement image in a conventional video telephony terminal will be described with reference to FIG. 1.

A user designates the replacement image before video communication (S100). At this time, the replacement image may be a still or moving image. The replacement image may be a photo of a user, an image of a partially transparent frame, or the like.

When a video communication connection is established (S102), the user may select whether to transmit the replacement image or a camera-captured image to another party (S104).

When the replacement image is not selected, the camera-captured image is transmitted to the other party (S106).

When the replacement image is selected, the replacement image designated in the replacement-image designation step S100 is superimposed on the camera-captured image and is transmitted to the other party (S108).

As mentioned above, the replacement still or moving image should be designated in advance before video communication. However, in this case, it is difficult for the user to quickly replace only a target image region since stored images may be limited.

Also, the conventional video telephony terminal may transmit only camera-captured images to the other party. In order to transmit a message generated by the user during video communication, the message should be transmitted in the format of text after releasing a video communication connection or the message having the format of text should be transmitted through a simultaneous voice and data (SVD) service during video communication.

There is a problem in that a means for transferring a user's message other than his or her speech to another party through the conventional video telephony terminal may be limited.

SUMMARY OF THE INVENTION

To address the above-discussed deficiencies of the prior art, it is a primary object of the present invention to provide a video telephony terminal and an image transmission method thereof that can interrupt a particular region of a camera-captured image upon establishing video communication by receiving position information regarding a still image input through an input unit capable of sensing an input position such as a touch screen or the like, generating a still image having a desired pattern in a user-desired image region, synthesizing the generated still image with the camera-captured image, and transmitting a message input to the touch screen in real time.

According to an aspect of the present invention, there is provided a method for transmitting an image from a video telephony terminal including the steps of: receiving an input of position information of a point, a line and an area forming a still image from a user to be synthesized with a camera-captured image during video communication; and generating an image to be transmitted to another party by generating the still image from the input position information and synthesizing the generated still image with the camera-captured image.

The method may further include the step of: receiving setting values input for a still-image generation process from the user before the still-image position information is input.

The still-image generation process may be performed by setting a timeout time when the still image is synthesized with the camera-captured image, a radius and color of a point serving as an element of the still image, a thickness and color of a line, a color of an area, and transparency of the still image.

The step of generating the image to be transmitted may include the steps of: generating the still image from the input still-image position information; synthesizing the generated still image with the camera-captured image; and transmitting the synthesized image to the other party.

The step of generating the still image may include the steps of: generating layers corresponding to a still image generated by a still-image position information input; storing the generated layers along with a still-image position information input time in an internal memory; and generating the still image by synthesizing all layers of which a timeout time has not elapsed among the layers stored in the internal memory at a given interval.

The step of generating the layers may include the steps of: generating the point by the radius and color thereof set for the still-image generation process, generating the line by the thickness and color thereof set for the still-image generation process, and generating the area filled with the color thereof set for the still-image generation process.

When the user selects one position, the step of generating the layers may include the step of: generating one point at an input position.

When the user inputs movement to another position in a state in which one position has been selected, the step of generating the layers may include the steps of: generating a curve along a movement path and generating an area having a boundary line of a circle around the curve.

When the user simultaneously selects two different positions, the step of generating the layers may include the step of: generating one line segment of which both ends are the selected positions.

When the user simultaneously selects three or more different positions, the step of generating the layers may include the step of: generating a polygonal area having a minimum area including all the selected positions.

The step of generating the still image may include the step of: making a color change to a transparent color for pixels uniformly distributed at a ratio corresponding to a set degree of transparency among pixels of the generated still image.

The transparent color may be defined as a color ignored without being processed in the step of synthesizing the still image and the camera-captured image.

According to another aspect of the present invention, there is provided a video telephony terminal including: an input unit that receives an input of position information of a point, a line and an area forming a still image from a user to be synthesized with a camera-captured image and providing the still-image position information to an image processor; and the image processor then generates the still image by receiving the still-image position information from the input unit and generates an image to be transmitted by synthesizing the still image with the camera-captured image.

The input unit may provide the image processor with coordinates of a position selected by the user by sensing the user's touch, temperature, pressure, and magnetic field.

The input unit may be a touch screen.

The image processor may include: a still-image generation module that generates the still image by receiving the still-image position information from the input unit; and an encoding module that generates the image to be transmitted by synthesizing the still image received from the still-image generation module with the camera-captured image.

The video telephony terminal may further include a user interface that receives setting values input for a still-image generation process from the user to provide the setting values to the still-image generation module and controls the still-image generation module to generate the still image based on the setting values.

The still-image generation process may be performed by setting a timeout time when the still image is synthesized with the camera-captured image, a radius and color of a point serving as an element of the still image, a thickness and color of a line, a color of an area, and transparency of the still image.

The still-image generation module may generate the point by the radius and color thereof set for the still-image generation process, generate the line by the thickness and color thereof set for the still-image generation process, and generate the area filled with the color thereof set for the still-image generation process.

The video telephony terminal may further include: an internal memory that temporarily stores the still image generated by the still-image generation module.

The still-image generation module may generate layers corresponding to a still image generated by a still-image position information input of one unit, store the generated layers along with a still-image position information input time in the internal memory, repeat an operation until there is no layer stored in the internal memory, generate the still image by synthesizing all layers of which a timeout time has not elapsed after the input time among layers stored in the internal memory, and delete layers timed out after the input time from the internal memory.

When the user selects one position, the still-image generation module may generate the layers by generating one point at an input position.

When the user inputs movement to another position in a state in which one position has been selected, the still-image generation module may generate the layers by generating a curve along a movement path and generating an area having a boundary line of a circle around the curve.

When the user simultaneously selects two different positions, the still-image generation module may generate the layers by generating one line segment of which both ends are the selected positions.

When the user simultaneously selects three or more different positions, the still-image generation module may generate the layers by generating a polygonal area having a minimum area including all selected positions.

The still-image generation module may make a color change to a transparent color for pixels uniformly distributed at a ratio corresponding to a set degree of transparency among pixels of the generated still image.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video telephony terminal.

Figure 2:
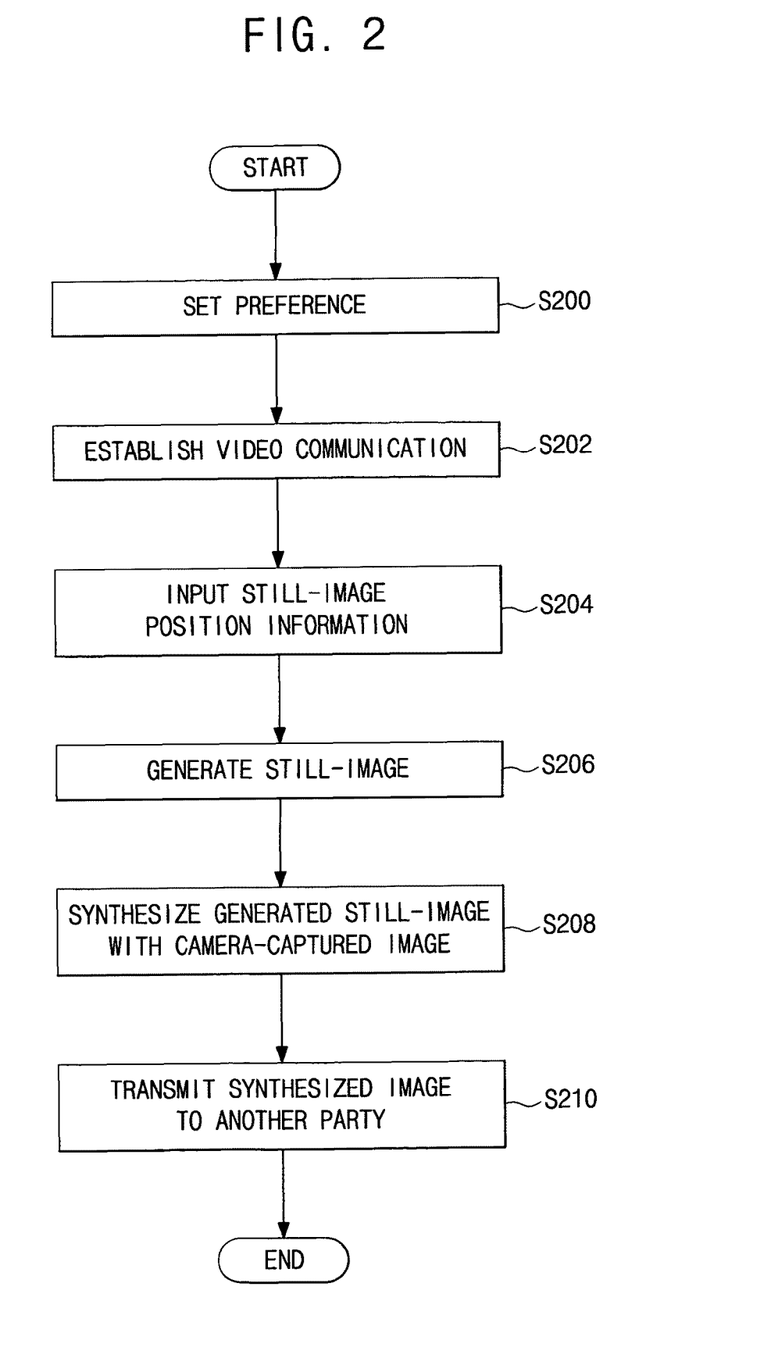
FIG. 2 is a flowchart illustrating an image transmission method for use in a video telephony terminal according to an exemplary embodiment of the present invention.

FIG. 2 is a flowchart illustrating an image transmission method for use in a video telephony terminal according to an exemplary embodiment of the present invention.

A user inputs setting values for a still-image generation process via an environment setting interface (preference setting interface) (S200).

In the preference setting step S200, the user can define a timeout time when a still image is synthesized with a camera-captured image, a radius and color of a point serving as an element of the still image, a thickness and color of a line, a color of an area, and transparency of the entire still image.

When a video communication connection is established, an image of another party received via a network and the camera-captured image are displayed on the video telephony terminal (S202). At this time, the video telephony terminal can provide an entire-screen display option. When the entire-screen display option is selected, the video telephony terminal displays the camera-captured image in a size of the entire screen.

The user inputs still-image position information through an input unit (S204). The still-image position information includes position information of a point, a line, and an area configuring the still image with which the user synthesizes the camera-captured image.

The input unit can obtain coordinates of a position selected by the user by sensing the variation of the user's touch, temperature, pressure, or magnetic field. The input unit can perform a display function as well as an input function. Accordingly, the user can select a particular position while viewing the camera-captured image and can simultaneously input one or more positions.

At this time, all inputs to the input unit during video communication are not unconditionally regarded as still-image position information inputs. When the entire-screen display option is not selected in the video communication connection step S202, a certain input can be determined to be a still-image position information input only when there is a touch screen input in a display area of the camera-captured image (S204). When the entire-screen display option is selected in the video communication connection step S202, an input in every region of the touch screen can be determined to be a still-image position information input (S204).

The video telephony terminal receives the still-image position information input (S204), and generates a still image based on the radius and color of the point, the thickness and color of the line, and the color of the area set in the preference setting step S200 (S206).

The video telephony terminal synthesizes the still image generated in the user image generation step S206 with the camera-captured image (S208).

The video telephony terminal provides the other party with a synthesized image achieved by synthesizing the user image and the camera-captured image in the synthesis step S208 (S210).

Figure 3:
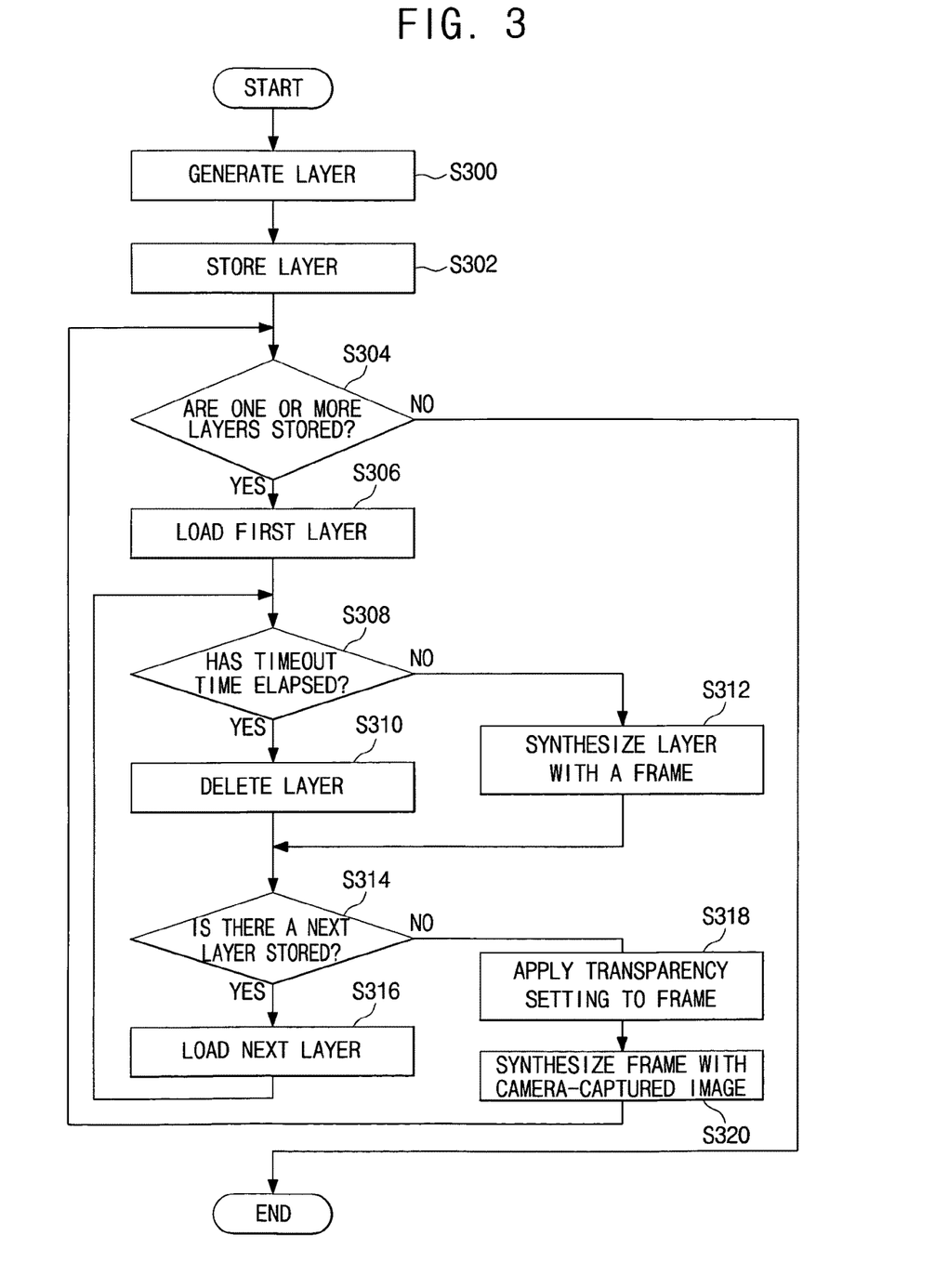
FIG. 3 is a flowchart illustrating a still-image generation process in the image transmission method for use in the video telephony terminal according to an exemplary embodiment of the present invention.

FIG. 3 is a flowchart illustrating a still-image generation process in the image transmission method for use in the video telephony terminal according to an exemplary embodiment of the present invention. The still-image generation step S206 of FIG. 2 will be described in detail.

When the user inputs still-image position information, a still-image layer is generated (S300).

The still-image position information input can be one single-position input, one multi-position input, or position movement in a state of one input.

Also, the still-image position information input can be one or more single-position inputs, one or more multi-position inputs, or position movement in a state of one or more inputs in a preset time.

After the layer is generated (S300), the generated layer is stored in an internal memory along with the time (S302).

A method for generating a still image to be synthesized with a camera-captured image by repeatedly synthesizing layers as long as there are one or more layers of which a timeout time has not elapsed will be described.

A determination is made whether there are one or more layers stored in the internal memory (S304). When there is no layer stored in the internal memory, the still-image generation step ends. An operation for synthesizing a camera-captured image with a still image input by the user is no longer performed.

When there are one or more layers stored in the internal memory, a first layer of the stored layers is loaded (S306).

A determination is made whether the timeout time has elapsed by computing a difference between the present time and a time recorded in the currently loaded layer (S308).

When the timeout time has elapsed, a corresponding layer is deleted from the internal memory (S310). When the timeout time has not elapsed, the corresponding layer is synthesized with a frame (S312). The frame can be a transparent image temporarily generated for a target still image to be generated by combining layers.

A determination is made whether there is a next layer in the internal memory (S314).

When there is a next layer, the next layer is loaded (S316) and a determination is made whether a timeout time of the corresponding layer has elapsed (S308).

When there is no next layer, it is determined that all layers of which the timeout time has not elapsed have been synthesized with respect to all entries currently stored in the internal memory. Among pixels of the frame, the transparency setting in the preference setting step is applied by making a color change to a transparent color for pixels uniformly distributed at a ratio corresponding to the transparency setting for the image generation process (S318).

The frame to which the transparency has been applied is synthesized with a camera-captured image (S320). The camera-captured image synthesis step S320 is the same as the camera-captured image synthesis step S208 of FIG. 2.

Then, a determination is repeatedly made whether there are one or more layers stored in the internal memory (S304). When there is no stored layer, the still-image generation step ends, and the operation for synthesizing a still image input by the user with a camera-captured image ends. On the other hand, when there are one or more stored layers, the frame generation process is repeated.

Figure 4:
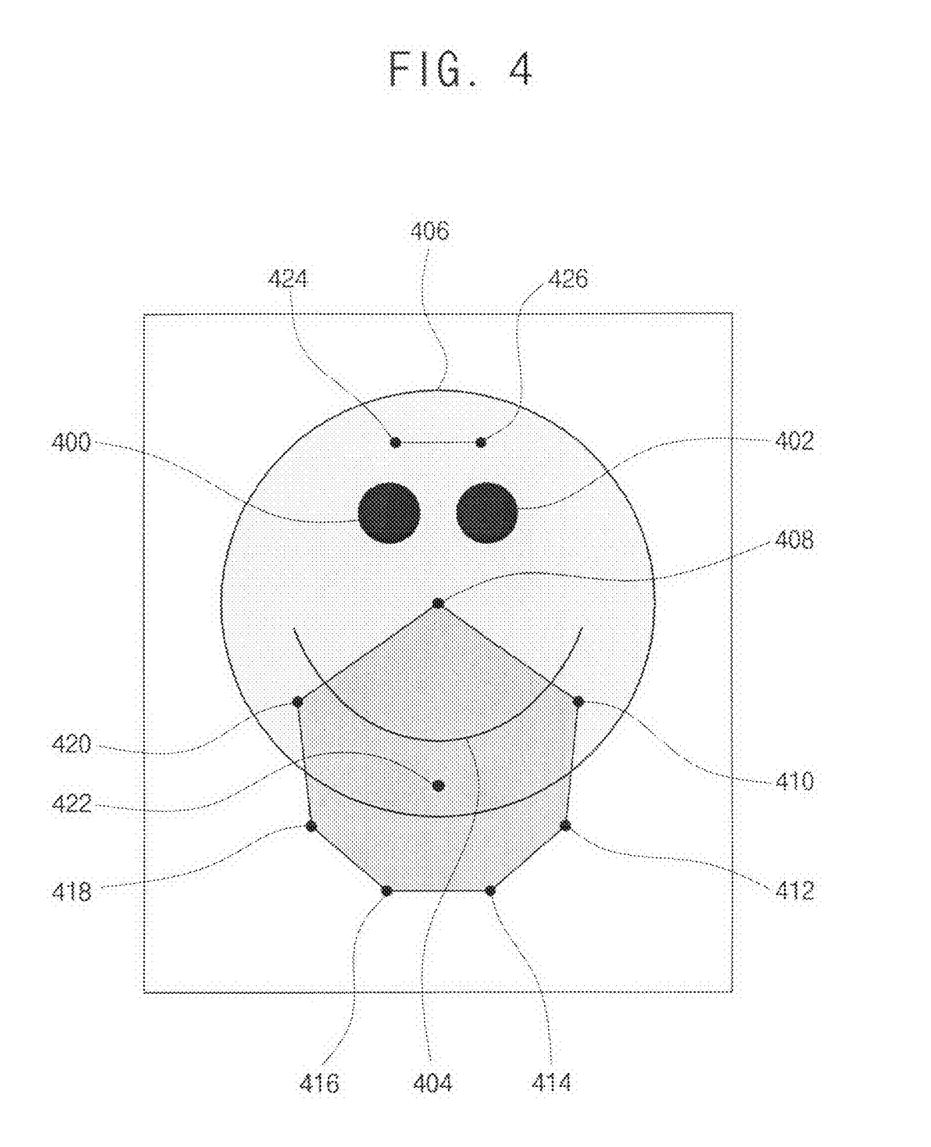
FIG. 4 illustrates a layer generation process based on a still-image position information input of one unit in the image transmission method for use in the video telephony terminal according to an exemplary embodiment of the present invention.

FIG. 4 illustrates a layer generation process based on a still-image position information input in the image transmission method for use in the video telephony terminal according to an exemplary embodiment of the present invention. The layer generation step S300 will be described in detail.

In the layer generation step S300, a point, line, and area can be generated on a transparent background having the size of a camera-captured image using the following method.

When the user inputs one position, points 400 and 402 are generated at the input position.

When the user inputs the movement to another position in a state in which one position has been selected, a curve along a movement path is generated as indicated by reference numeral 404, and an area having a boundary line of a circle around the curve is generated as indicated by reference numeral 406.

When the user simultaneously selects and inputs two different positions 424 and 426, one line segment of which both ends are the selected positions is generated.

When the user simultaneously selects and inputs three or more different positions 408, 410, 412, 414, 416, 418, 420, and 422 a polygonal area having a minimum area including all the selected positions is generated.

Figure 5:
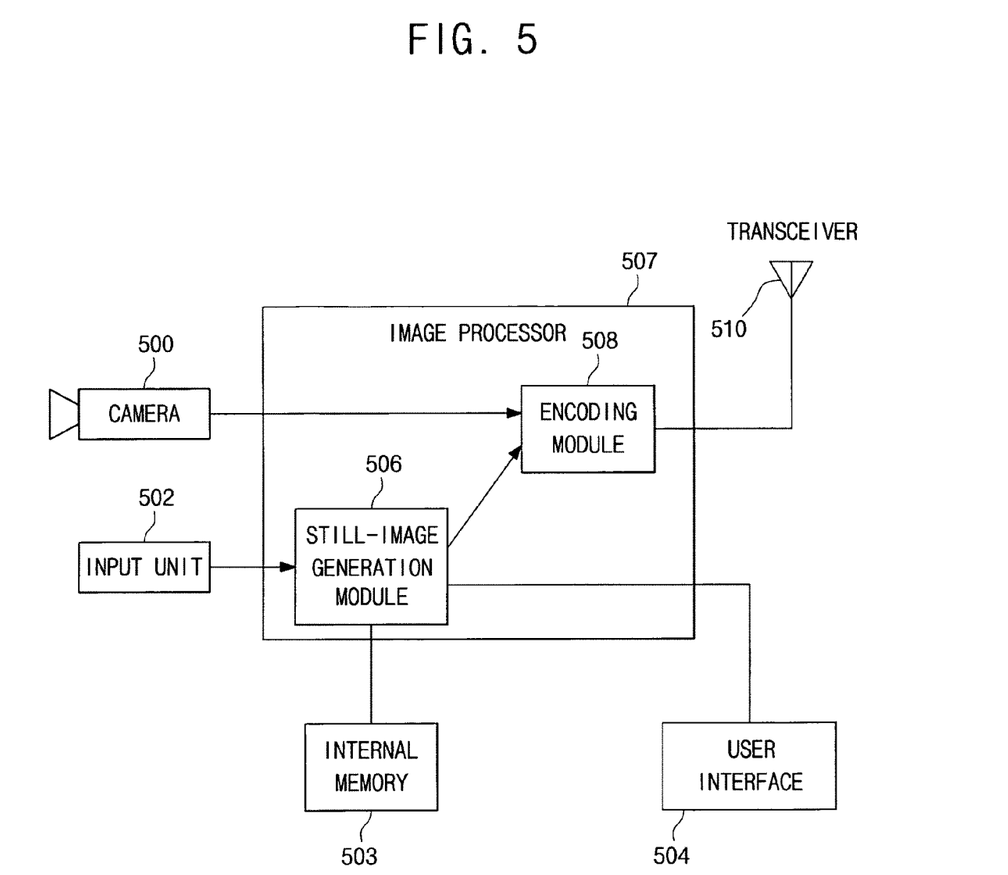
FIG. 5 is a block diagram illustrating a detailed configuration of the video telephony terminal equipped with a touch screen according to an exemplary embodiment of the present invention.

FIG. 5 is a block diagram illustrating a detailed configuration of the video telephony terminal equipped with a touch screen according to an exemplary embodiment of the present invention.

As illustrated in FIG. 5, the video telephony terminal includes a camera 500, an input unit 502, an internal memory 503, a user interface 504, an image processor 507, and a transceiver 510.

The camera 500 provides the image processor 507 with an image to be transmitted to another party upon video communication.

The input unit 502 displays a camera-captured image and an image of the other party received through the transceiver 510, receives a still-image position information input from the user, and provides the image processor 507 with the received still-image position information input.

The input unit 502 can be implemented with a touch screen.

The internal memory 503 stores layers generated by the image processor 507. The layers represent a still image generated from a still-image position information input by the user.

The user interface 504 provides the image processor 507 with setting values input for a still-image generation process from the user.

The image processor 507 generates the still image by receiving still-image position information from the input unit 502. The still image is synthesized with the camera-captured image received from the camera 500. Therefore, an image to be transmitted to the other party is generated and output to the transceiver 510.

As illustrated in FIG. 5, the image processor 507 includes a still-image generation module 506 and an encoding module 508.

The still-image generation module 506 receives still-image position information from the input unit 502, generates layers based on user image setting values received from the user interface 504, stores the generated layers in the internal memory 503, generates the still image by synthesizing all layers before a timeout time stored in the internal memory has elapsed, and provides the still image to the encoding module 508.

The encoding module 508 synthesizes the still images received from the camera 500 and the still-image generation module 506 and provides the transceiver 510 with a synthesized image.

The transceiver 510 receives voice and image data of the other party via a network, receives the synthesized image of the user image and the camera-captured image from the encoding module 508, and transmits the synthesized image to the other party via the network.

Next, an operation for generating and transmitting a user image of the video telephony terminal equipped with the touch screen according to an exemplary embodiment of the present invention will be described.

The user sets a timeout time, a radius and color of a point, a thickness and color of a line, a color of an area, transparency, and the like using a user image setting interface provided by the user interface 504.

The user interface 504 provides setting values input by the user to the still-image generation module 506.

When a video communication connection is established, the input unit 502 displays an image captured by the camera 500 and an image of the other party received via the transceiver 510 and the camera 500 provides the captured image to the encoding module 508.

When the user inputs still-image position information via the input unit 502, the input unit 502 provides the input information to the still-image generation module 506. The still-image generation module 506 generates a still image based on setting values for the still-image generation process received from the user interface 504 according to the still-image position information received from the input unit 502 and provides the generated still image to the encoding module 508.

Next, the still-image generation process of the still-image generation module 506 will be described.

The still-image generation module 506 generates a layer when there is a still-image position information input of one unit from the input unit 502.

The still-image position information input of one unit can be one single-position input, one multi-position input, or position movement in a state of one input.

Also, the still-image position information input of one unit can be one or more single-position inputs, one or more multi-position inputs, or position movement in a state of one or more inputs in a preset time. At this time, the still-image generation module 506 can store inputs from the input unit 502 until all elements of the still-image position information are input.

The layer generation method can be as follows.

A point, line, and area are generated on a transparent background having the size of a camera-captured image.

When the user selects one position, one point is generated at the selected position.

When the user inputs the movement to another position in a state in which one position has been selected, the still-image generation module 506 generates a curve along a movement path and generates an area having a boundary line of a circle around the curve.

When the user simultaneously inputs two different positions, the still-image generation module 506 generates one line segment of which both ends are the input positions.

When the user simultaneously selects and inputs three or more different positions, the still-image generation module 506 generates a polygonal area having a minimum area including all the selected positions.

Then, the still-image generation module 506 stores layers generated by the above-described method and a still-image position information input time in the internal memory 503.

The still-image position information input time can be a time of the last input by the user or a time when a storage operation is performed in the internal memory 503.

Then, the still-image generation module 506 can generate a still image by synthesizing all layers of which a timeout time has not elapsed after the input time among layers stored in the internal memory 503 and can delete timed-out layers after the input time from the internal memory 503.

As long as there are one or more layers stored in the internal memory, the still-image generation module 506 repeats the layer synthesis operation and the operation for deleting the timed-out layers at a given interval.

The still-image generation module 506 can make a color change to a transparent color for pixels uniformly distributed at a ratio corresponding to a degree of transparency set for the image generation process among pixels of the still image generated by synthesizing the layers, and can provide the image to the encoding module 508.

The encoding module 508 performs the synthesis operation by superimposing the image received from the still-image generation module 506 on the image received from the camera 500 and provides the synthesized image to the transceiver 510.

The transceiver 510 transmits the image from the encoding module 508 to the other party via the network.

According to exemplary embodiments of the present invention, a user's demand for privacy protection can be satisfied by replacing an image with a desired pattern in a user-desired image region during video communication and a message freely input to a video telephony terminal can be inserted into a camera-captured image, thereby allowing the user to transmit a message without regard to any format.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting an image from a video telephony terminal, comprising:
    displaying a first image on a display of the terminal;
    receiving an input of position information on the first image on the display from a user, the position information defining one or more portions of the first image to form a still image to be synthesized with a camera-captured image during video communication; and
    generating a second image to be transmitted to another party by generating the still image from the input position information and synthesizing the generated still image with the camera-captured image.

2. The method of claim 1, wherein generating the second image to be transmitted comprises:
    generating the second image in which the camera-captured image is synthesized with the still image is achieved by generating one point at an input position when the user selects one position and generating a curve along a movement path and an area having a boundary line of a circle around the curve when the user inputs movement to another position in a state in which one position has been selected.

3. The method of claim 1, wherein the step of generating the second image to be transmitted comprises:
    generating the second image in which the camera-captured image has been synthesized with the still image is achieved by generating one line segment of which both ends are selected positions when the user simultaneously selects two different positions, and generating a polygonal area having a minimum area including all selected positions when the user simultaneously selects three or more different positions.

4. The method of claim 3, wherein receiving the input still-image position information comprises:
    receiving a setting values input for a still-image generation process from the user before the still-image position information is input.

5. The method of claim 4, wherein the still-image generation process is performed by setting a timeout time when the still image is synthesized with the camera-captured image, a radius and a color of a point serving as an element of the still image, a thickness and a color of a line, a color of an area, and a transparency of the still image.

6. The method of claim 5, wherein generating the second image to be transmitted comprises:
    generating the still image from the input position information in which the point is generated by the radius and the color thereof set for the still-image generation process, the line is generated by the thickness and the color thereof set for the still-image generation process, and the area is filled with the color thereof set for the still-image generation process.

7. The method of claim 1, wherein generating the second image to be transmitted comprises:
    generating the still image from the input still-image position information;
    synthesizing the generated still image with the camera-captured image; and
    transmitting the synthesized image to the other party.

8. The method of claim 7, wherein generating the still image comprises:
    generating layers corresponding to a still image generated by a still-image position information input;
    storing the generated layers along with a still-image position information input time;
    deleting layers which have timed out after the input time from among the stored layers; and
    generating the still image by synthesizing the remaining layers.

9. The method of claim 8, wherein generating the still image by synthesizing the remaining layers comprises:
    generating the still image by continuously repeating the steps at a given interval as long as there are one or more stored layers.

10. The method of claim 7, wherein generating the still image comprises:
    applying transparency by making a color change to a transparent color for pixels uniformly distributed at a ratio corresponding to a set degree of transparency among pixels of the generated still image after the still image is generated.

11. A video telephony terminal comprising:
a user interface configured to display a first image on a display of the terminal;
an input unit configured to:
receive from a user an input of position information of a point, a line and an area on the first image on the display, the position information defining one or more portions of the first image to form a still image to be synthesized with a camera-captured image, and
provide the still-image position information to an image processor;
the image processor configure to generate the still image by receiving the still-image position information from the input unit and generate a second image to be transmitted by synthesizing the still image with the camera-captured image.

12. The video telephony terminal of claim 11, wherein the input unit comprises a touch screen.

13. The video telephony terminal of claim 11, wherein the image processor is configured to generate one point at an input position when the still-image position information input is one position, generate a curve along a movement path and an area having a boundary line of a circle around the curve when the user inputs movement to another position in a state in which one position has been selected, generate one line segment of which both ends are selected positions when two different positions are simultaneously input, and generate a polygonal area having a minimum area including all selected positions when three or more different positions are simultaneously input.

14. The video telephony terminal of claim 13, wherein the user interface is configured to receive a setting values input for a still-image generation process from the user, provide the setting values to the image processor and instruct the image processor to generate the still image based on the setting values.

15. The video telephony terminal of claim 14, wherein the still-image generation process is performed by setting a timeout time when the still image is synthesized with the camera-captured image, a radius and a color of a point serving as an element of the still image, a thickness and a color of a line, a color of an area, and a transparency of the still image.

16. The video telephony terminal of claim 11, wherein the image processor includes:
a still-image generation module configured to generate the still image by receiving the still-image position information from the input unit; and
an encoding module configured to generate the second image to be transmitted by synthesizing the still image received from the still-image generation module with the camera-captured image.

17. The video telephony terminal of claim 16, further comprising:
an internal memory configured to store a temporary still image generated by the still-image generation module.

18. The video telephony terminal of claim 17, wherein the still-image generation module is configured to generate layers corresponding to a still image generated by a still-image position information input, store the generated layers along with a still-image position information input time in the internal memory, repeat an operation until there is no layer stored in the internal memory, generate the still image by deleting layers which have timed out after the input time from the internal memory, synthesize the remaining layers stored in the internal memory, and provide the still image to the encoding module.

19. The video telephony terminal of claim 18, wherein the still-image position information input includes one single-position input, one multi-position input, and a position movement in a state of one input.

20. The video telephony terminal of claim 18, wherein the still-image position information input includes one or more single-position inputs, one or more multi-position inputs, and a position movement in a state of one or more inputs within a preset time.

21. The video telephony terminal of claim 15, wherein the image processor makes a color change to a transparent color for pixels uniformly distributed at a ratio corresponding to a set degree of transparency among pixels of the generated still image.

* * * * *